(12) United States Patent
Zhao et al.

(10) Patent No.: US 6,964,791 B2
(45) Date of Patent: Nov. 15, 2005

(54) HIGH-TEMPERATURE ARTICLES AND METHOD FOR MAKING

(75) Inventors: Ji-Cheng Zhao, Latham, NY (US); Don Mark Lipkin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/749,896

(22) Filed: Dec. 31, 2003

(65) Prior Publication Data

US 2004/0157081 A1 Aug. 12, 2004

Related U.S. Application Data

(62) Division of application No. 10/064,273, filed on Jun. 27, 2002, now Pat. No. 6,746,783.

(51) Int. Cl.[7] .................. C23C 4/00; C23C 14/16; C23C 14/58; C23C 16/00; C23C 30/00
(52) U.S. Cl. .................. 427/405; 427/250; 427/255.28; 427/255.34; 427/255.36; 427/372.2; 427/376.7; 427/383.1
(58) Field of Search ................. 427/250, 404, 427/419.1, 255.23, 255.28, 255.36, 255.34, 427/248.1, 372.2, 376.6, 376.7, 376.8, 383.1, 427/405

(56) References Cited

U.S. PATENT DOCUMENTS 3,874,901 A * 4/1975 Rairden, III ................. 427/250
4,910,092 A * 3/1990 Olson et al. ................. 428/557
4,933,239 A * 6/1990 Olson et al. ................. 428/557
5,660,886 A 8/1997 Peterman et al. ........ 427/376.6
5,716,720 A 2/1998 Murphy ..................... 428/623
6,066,405 A * 5/2000 Schaeffer .................... 428/547
6,153,313 A 11/2000 Rigney et al. .............. 428/632
6,255,001 B1 7/2001 Darolia ....................... 428/610
6,287,644 B1 9/2001 Jackson et al. ............. 427/566
6,306,524 B1 * 10/2001 Spitsberg et al. ........... 428/621
6,344,282 B1 2/2002 Darolia et al. .............. 428/652
6,471,791 B1 10/2002 Nazmy et al. .............. 148/429
6,585,864 B1 * 7/2003 Fisher et al. ............ 204/192.16
6,746,783 B2 * 6/2004 Zhao et al. ................. 428/680
2002/0009611 A1 1/2002 Darolia et al.

* cited by examiner

Primary Examiner—Michael E. La Villa
(74) Attorney, Agent, or Firm—Paul J. DiConza; William E. Powell, III

(57) ABSTRACT

A coated article, a coating for protecting an article, and a method for protecting an article are provided. The article comprises a metallic substrate and a substantially single-phase coating disposed on the substrate, wherein the coating comprises nickel (Ni) and at least about 30 atomic percent aluminum (Al); the coating further comprises a gradient in Al composition, the gradient extending from a first Al concentration level at an outer surface of the coating to a second Al concentration level at an interface between the substantially single-phase coating and the substrate, wherein the first Al concentration level is greater than the second Al concentration level and the second concentration level is at least about 30 atomic percent Al.

29 Claims, 1 Drawing Sheet

HIGH-TEMPERATURE ARTICLES AND METHOD FOR MAKING

This application is a division of application Ser. No. 10/064,273, filed on Jun. 27, 2002, now U.S. Pat. No. 6,746,783.

BACKGROUND OF THE INVENTION

This invention relates to oxidation resistant coatings. More particularly, this invention relates to articles having a coating that is resistant to failure in high temperature oxidative environments and methods of protecting an article in a high temperature, oxidative environment.

Nickel (Ni), cobalt (Co), and iron (Fe) based alloys are frequently used to form articles designed for use in high temperature, highly oxidative environments. Such articles include components that are used in turbine systems, such as, but not limited to, aircraft turbines, land-based turbines, marine-based turbines, and the like. To survive in such environments, articles made of these alloys often require coatings to protect the underlying alloys against oxidation and/or hot corrosion. The coating, which is frequently a nickel aluminide (NiAl)-based material, can also be used to provide adherence to an outer thermal barrier coating, where such a coating is employed.

Performance of the nickel aluminide-based coating is adversely affected by surface-connected coating defects, cracks, and oxygen-permeable second-phase stringers. It is therefore highly desirable to reduce such defects. Grit blasting and shot-peening have been applied with marginal success to heal defects; but such techniques introduce the risk of additional coating damage.

In addition to surface defects, the physical vapor deposition processes (also referred hereinafter as "PVD") that are used to deposit nickel aluminide-based coatings frequently result in the loss of aluminum during deposition. Attempts have been made to compensate for aluminum loss by either adjusting the composition of the PVD source material or using post-PVD vapor-phase aluminizing. The success of such corrective attempts has been limited by problems with castability and ductility of the PVD source, coating adhesion, coating contamination, and chemistry control.

The present approaches have not been successful in either healing surface defects or compensating for lost aluminum in such nickel aluminide-based coatings. Consequently, nickel aluminide-based coatings often do not provide adequate protection for the underlying alloy substrates in such harsh environments. Therefore, there remains a need for a coating that provides protection for a metallic article in a high temperature, highly oxidative environment. There is also a need for an article having such a protective coating. Finally, there is a further need for a method of providing an article with such a protective coating.

BRIEF DESCRIPTION OF THE INVENTION

Embodiments of the present invention address these and other needs. One embodiment is an article comprising a metallic substrate; and a substantially single-phase coating disposed on the substrate, wherein the coating comprises nickel (Ni) and at least about 30 atomic percent aluminum (Al), wherein the coating further comprises a gradient in Al composition, the gradient extending from a first Al concentration level at an outer surface of the coating to a second Al concentration level at an interface between the substantially single-phase coating and the substrate; wherein the first Al concentration level is greater than the second Al concentration level and the second concentration level is at least about 30 atomic percent Al.

A second embodiment is a coating for protecting an article, the coating comprising a substantially single-phase coating disposed on a substrate, wherein the coating comprises nickel (Ni) and at least about 30 atomic percent aluminum (Al), wherein the coating further comprises a gradient in Al composition, the gradient extending from a first Al concentration level at an outer surface of the coating to a second Al concentration level at an interface between the substantially single-phase coating and the substrate; wherein the first Al concentration level is greater than the second Al concentration level and the second concentration level is at least about 30 atomic percent Al.

A third embodiment is a method for protecting an article from a high-temperature oxidative environment, the method comprising providing a substrate; disposing a first coating layer onto the substrate, wherein the first coating layer comprises nickel (Ni) and aluminum (Al); and disposing a second coating layer onto the first coating layer, wherein the second coating layer comprises at least about 90 atomic percent aluminum.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
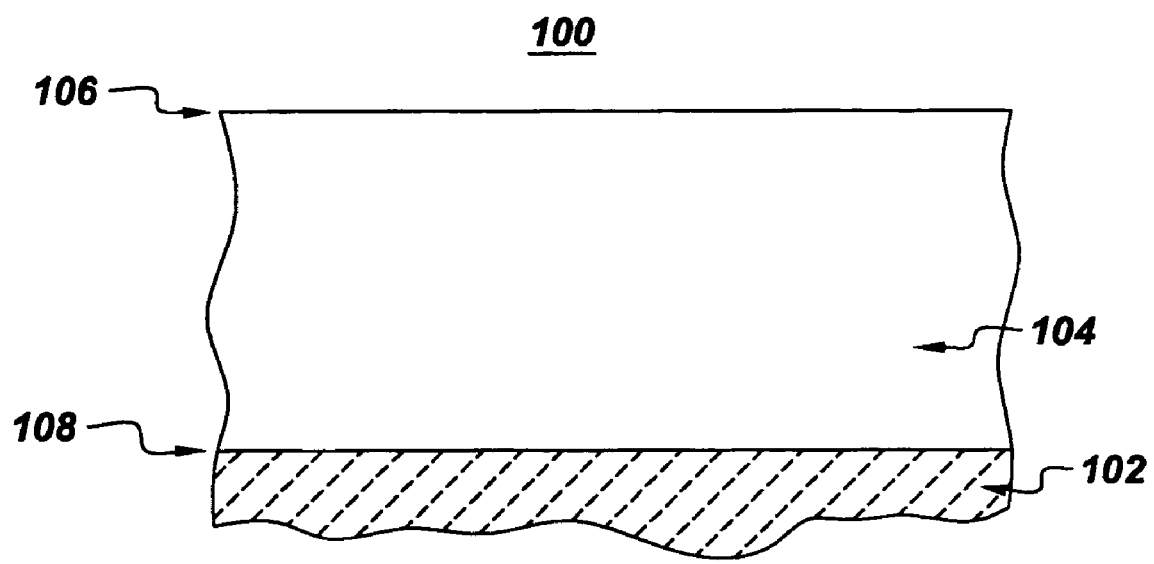
FIG. 1 is a schematic representation of a cross-section of an article of the present invention.

In the following description, like reference characters designate like or corresponding parts throughout the several views shown in the figures. It is also understood that terms such as "op," "bottom," "outward," "inward," and the like are words of convenience and are not to be construed as limiting terms.

Referring to the drawings in general and to FIG. 1 in particular, it will be understood that the illustrations are for the purpose of describing a preferred embodiment of the invention and are not intended to limit the invention thereto. FIG. 1 is a schematic representation of a cross-section of an article 100 of the present invention. Article 100 may be any object that is exposed to a high temperature (i.e., >500° C.) gas environment. Examples of article 100 include, but are not limited to, components, such as turbine airfoils, combustors, and turbine disks, of a gas turbine assembly.

Article 100 comprises a metallic substrate 102 and a coating 104 (also referred to herein as a "reacted coating layer" 104) disposed on at least one surface of metallic substrate 102. Metallic substrate 102 typically comprises at least one of a nickel-base, cobalt-base, and iron-base alloy. Preferably, metallic substrate 102 comprises a superalloy of one of nickel, iron, and cobalt.

Coating 104 serves to protect substrate 102 from the highly oxidative environment encountered in such structures as turbine assemblies, reactors, boilers, and the like. Coating 104 is substantially a single phase, meaning at least about 80% of coating by volume comprises a single phase. In one embodiment, the single phase of coating 104 comprises a nickel aluminide having a B2 crystal structure. Coating 104 comprises nickel (Ni) and at least 30 atomic percent aluminum (Al). The concentration of aluminum in coating 104 varies from a first concentration at an outer surface 106 of coating 104 to a second concentration at an interface 108 between coating 104 and substrate 102, wherein the first concentration of aluminum is greater than the second concentration of aluminum. Thus, coating 104 has a concentration gradient of aluminum across its thickness. The second concentration is at least 30 atomic percent. Having a gradient in aluminum concentration within the coating advantageously provides aluminum-rich material at the outer surface 106 surface of the coating, where degradation mechanisms such as oxidation act to deplete the material of oxidation-resisting components, of which aluminum is an example. Thus, the gradient in aluminum concentration serves to enhance the oxidation resistance of the coating by placing more aluminum in the region in which it is most needed.

In further embodiments, coating 104 further comprises at least one of chromium (Cr), zirconium (Zr), cobalt (Co), and iron (Fe). Cobalt and iron, when present, are generally substituted for Ni, and may each be present in coating 104 in a concentration of up to about 20 atomic percent. In some embodiments, chromium is present in coating 104 at a concentration of up to about 15 atomic percent to further enhance the oxidation resistance of coating 104. In particular embodiments, chromium is present in coating 104 at a concentration in the range from about 4 atomic percent to about 12 atomic percent. Zirconium, in some embodiments, is present in coating 104 at a concentration of up to about 2 atomic percent, to further enhance the mechanical and oxidation resistance properties of coating 104. In one embodiment, zirconium is present in coating 104 in a concentration in the range from about 0.2 atomic percent to about 0.8 atomic percent.

In a particular embodiment, coating 104 comprises a substantially single-phase nickel aluminide having a B2 crystal structure. Coating 104 of this embodiment comprises nickel, chromium, zirconium, up to about 20 atomic percent Co, up to about 20 percent iron, and at least about 30 atomic percent aluminum. As above, aluminum is present in a concentration gradient through the thickness of coating 104. The aluminum concentration varies from a first concentration at an outer surface 106 of coating 104 to a second concentration at an interface 108 between coating 104 and substrate 102.

In addition to comprising at least one of chromium, zirconium, cobalt, and iron, coating 104 may further comprise at least one element selected from the group consisting of hafnium (Hf), yttrium (Y), silicon (Si), titanium (Ti), lanthanum (La), cerium (Ce), and tantalum (Ta); in selected embodiments, the at least one element is present in coating 104 at a concentration of up to about 3 atomic percent. Coating 104 may also include up to about 0.1 atomic percent of at least one of carbon and boron.

Coating 104 has a thickness greater than about 10 micrometers, such as in the range from about 10 micrometers to about 100 micrometers, in some embodiments. In one embodiment, the thickness of coating 104 in the range from about 25 micrometers to about 75 micrometers. Those skilled in the art will appreciate that selection of a particular coating thickness is dependent upon particular factors such as, for example, expected exposure temperature, desired service lifetime, processing coats, and the like. In certain embodiments, article 100 further comprises a thermal barrier coating (not shown) disposed over coating 104 to provide enhanced thermal protection. In particular embodiments, the thermal barrier coating comprises a ceramic material, such as, for example, yttria-stabilized zirconia.

Coating 104 may be formed on substrate 102 by first depositing a first coating layer comprising nickel and aluminum on substrate 102. The first coating layer is deposited by one of ion plasma deposition, electron beam physical vapor deposition, thermal spray deposition, and plasma spray deposition, and combinations thereof.

At least one of chromium, zirconium, cobalt, and iron may also be deposited in the first layer using by the above-mentioned techniques. Chromium may be present in the first layer in a concentration of up to about 15 atomic percent. In one embodiment, chromium is present in the first layer in a concentration in the range from about 4 atomic percent to about 12 atomic percent. Zirconium may be present in the first layer in a concentration of up to about 2 atomic percent. In one embodiment, zirconium is present in the first layer in a concentration in the range from about 0.2 atomic percent to about 0.8 atomic percent. Cobalt and iron may each be present in the first layer in a concentration of up to 20 atomic percent. In addition to comprising at least one of chromium, zirconium, cobalt, and iron, the first layer may further include at least one of hafnium, yttrium, silicon, titanium, lanthanum, cerium, and tantalum.

The first coating layer has a thickness of greater than about 100 micrometers. In one embodiment, the first layer has a thickness in the range from about 10 micrometers to about 100 micrometers. In another embodiment, the first layer has a thickness in the range from about 25 micrometers to about 75 micrometers.

A second coating layer comprising at least 90 atomic percent aluminum is then deposited on the first coating layer using a physical vapor deposition technique such as, but not limited to, electron beam physical vapor deposition, and ion plasma deposition. In one embodiment, the second layer comprises at least about 95 atomic percent aluminum. In yet another embodiment, the second layer consists essentially of aluminum. The second layer has a thickness of at least 5 micrometers. In one embodiment, the second layer has a thickness in the range from about 5 micrometers to about 25 micrometers.

In further embodiments of the present invention, the second coating layer is reacted with the first coating layer to form reacted coating layer 104 (also referred to herein as coating 104). In one embodiment, reacted coating layer 104 is formed by heat treating first coating layer, second coating layer, and substrate 102 to a temperature in a range from about 700° C. to about 1200° C. for a time period ranging from about 0.5 hour to about 4 hours to react the first layer with the second coating layer. This heat treatment step is performed subsequent to the disposition of the second layer as described previously. Alternatively, coating 104 may be formed by reacting the first coating layer and the second coating layer by in situ heating during deposition of the second coating layer. The in situ heating causes the second coating layer, which is predominantly aluminum, to diffuse into the first coating layer; the predominately aluminum material then reacts with the first coating layer to form coating 104. Such in situ heating may be achieved by electron beam heating during physical vapor deposition of the second layer, or by applying a bias voltage to substrate 102 during ion plasma deposition of the second layer. The coating 104 formed by reacting the first coating layer and second coating layer is, in some embodiments, substantially single phase, the single phase comprising in particular embodiments an intermetallic aluminide compound having a B2 crystal structure. The second coating layer provides an Al-rich cap to the first coating layer, improving high-temperature coating performance by covering the aforementioned microstructural defects, such as surface-connected coating defects, cracks, and oxygen-permeable second-phase stringers, in coating 104 and raising the aluminum content in coating 104.

In certain embodiments, a thermal barrier coating is disposed over one of the second coating layer and the reacted coating layer (104). Whether the thermal barrier coating is disposed over the second coating layer or the reacted coating layer is determined by the order in which the processing steps of reacting the first and second coating layers and disposing the thermal barrier coating are executed. The thermal barrier coating may be applied either prior to or after reacting the first and second layers, if the reacting step is desired for a particular embodiment. In particular embodiments, the thermal barrier coating is a ceramic, such as yttria-stabilized zirconia.

Embodiments of the present invention also include a method for protecting an article, such as, but not limited to, a component of a gas turbine assembly, in a high temperature, oxidative environment. Such components include turbine airfoils, turbine disks, and combustors, and typically comprise at least one of a nickel based alloy, a cobalt-based alloy, and an iron-based alloy. In one embodiment, the nickel-, cobalt-, and iron-based alloys are superalloys. The method comprises providing a substrate and disposing the coating of the present invention according to the process described above for making the coating, including disposing a first coating layer onto said substrate, wherein said first coating layer comprises nickel (Ni) and aluminum (Al), and disposing a second coating layer onto said first coating layer, wherein said second coating layer comprises at least about 90 atomic percent aluminum. The various alternatives described above for the compositions and thickness of the first and second layers, as well as for additional processing steps such as reacting the layers to form a reacted coating layer 104, are applicable to the method embodiments of the present invention.

In one particular embodiment, the method for protecting an article in a high temperature, oxidative environment comprises the steps of: first providing a metallic substrate; depositing a first coating layer comprising nickel, aluminum, chromium, zirconium, up to about 20 atomic percent cobalt, and up to about 20 atomic percent iron onto the metallic substrate; depositing a second coating layer consisting essentially of aluminum onto the first coating layer using a physical vapor deposition technique such as, but not limited to, electron beam physical vapor deposition and ion plasma deposition; and reacting the first coating layer with the second coating layer to form a substantially single-phase reacted coating layer comprising a nickel aluminide having a B2 structure, the reacted coating layer having an aluminum concentration gradient extending from a first aluminum concentration level at an outer surface of the reacted coating layer to a second aluminum concentration level of at least about 30 atomic percent aluminum at an interface between the reacted coating layer and substrate 102, wherein the first aluminum concentration level is greater than the second aluminum concentration.

EXAMPLE

The following description is intended to further illustrate the advantages of certain exemplary embodiments of the present invention, and should not be construed as limiting the scope of the invention. Two groups of superalloy substrates were each coated with an about 40 micrometer thick layer of NiCrAlZr alloy, using ion plasma deposition (IPD). In one group, herein referred to as "Group A," the coating composition was, in atomic percent, about 33% Al, about 10% Cr, about 0.5% Zr, and the balance Ni. In the other group, herein referred to as "Group B," the coating composition was, in atomic percent, about 35% Al, about 5% Cr, about 1.2% Zr, and the balance Ni. For each group of substrates coated, a subset was further coated with a about 10 micrometer thick layer of material consisting essentially of aluminum using IPD. After deposition, the coated samples were subjected to a vacuum heat treatment of two hours at 1100° C. to form a single-phase reacted coating layer of B2-structured nickel aluminide, as described previously.

All of the specimens were tested by thermally cycling the specimens in air for 3 minutes at 1175° C. each cycle until the point at which the substrate began to oxidize, thereby signaling coating failure. Group A specimens processed without the additional Al coating step failed in the range of 162–260 cycles, while those processed with the additional Al coating step failed in the range of 380–440 cycles. Group B specimens processed without the additional Al coating step failed in the range of 227–239 cycles, while those processed with the additional Al coating step failed in the range of 400–429 cycles.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A method for protecting an article from a high-temperature oxidative environment, said method comprising:
   providing a substrate, said substrate comprising a material selected from the group consisting of a nickel-based superalloy, a cobalt-based superalloy, and an iron-based superalloy;
   disposing a first coating layer onto said substrate, wherein said first coating layer comprises nickel (Ni), zirconium (Zr), and aluminum (Al); and
   disposing a second coating layer onto said first coating layer, wherein said second coating layer comprises at least about 90 atomic percent aluminum.

2. The method of claim 1, wherein disposing said second coating layer comprises disposing said second layer using a physical vapor deposition technique selected from the group consisting of electron beam physical vapor deposition and ion plasma deposition.

3. The method of claim 1, wherein disposing said second coating layer comprises disposing a layer comprising at least about 95 atomic percent aluminum.

4. The method of claim 1, wherein said second coating layer consists essentially of aluminum.

5. The method of claim 1, wherein disposing said first layer comprises disposing said first layer using a technique selected from the group consisting of ion plasma deposition, electron beam physical vapor deposition, thermal spray deposition, and plasma spray deposition.

6. The method of claim 1, further comprising disposing a thermal barrier coating over said second coating layer.

7. The method of claim 1, wherein disposing said second coating layer comprises disposing a layer having a thickness of at least about 5 micrometers.

8. The method of claim 7, wherein said thickness is in the range from about 5 micrometers to about 20 micrometers.

9. The method of claim 1, wherein said Zr is present in said first layer at a concentration of up to about 2 atomic percent.

10. The method of claim 9, wherein said Zr is present at a concentration in the range from about 0.2 atomic percent to about 0.8 atomic percent.

11. The method of claim 1, wherein providing said substrate comprises providing a component of a gas turbine assembly.

12. The method of claim 11, wherein providing said component comprises providing at least one of a turbine airfoil, a turbine disk, and a combustor.

13. The method of claim 1, wherein disposing said first layer comprises disposing a first layer further comprising at least one element selected from the group consisting of chromium (Cr), up to about 20 atomic percent cobalt (Co), and up to about 20 atomic percent iron (Fe).

14. The method of claim 13, wherein said first layer comprises Cr, and wherein said Cr is present in said first layer ac a concentration of up to about 15 atomic percent.

15. The method of claim 14, wherein said Cr is present in said first layer at a concentration in the range from about 4 atomic percent to about 12 atomic percent.

16. The method of claim 13, wherein disposing said first layer comprises disposing a first layer further comprising at least one element selected from the group consisting of hafnium (Hf), yttrium (Y), silicon (Si), titanium (Ti), lanthanum (La), cerium (Ce), and tantalum (Ta).

17. The method of claim 1, wherein disposing said first coating layer comprises disposing a layer having a thickness of at least about 10 micrometers.

18. The method of claim 17, wherein said thickness is in the range from about 10 micrometers to about 100 micrometers.

19. The method of claim 18, wherein said thickness is in the range from about 25 micrometers to about 75 micrometers.

20. The method of claim 1, further comprising reacting said first coating layer with said second coating layer to form a reacted coating layer.

21. The method of claim 20, wherein said reacted coating layer comprises a substantially single-phase coating comprising an aluminide intermetallic compound.

22. The method of claim 21, wherein said single phase of said reacted coating layer comprises a B2-structured nickel aluminide (NiAl) phase.

23. The method of claim 21, wherein said reacted coating layer further comprises a gradient in Al composition, said gradient extending from a first Al concentration level at an outer surface of said reacted coating layer to a second Al concentration level at an interface between said substantially single-phase coating and said substrate, wherein said first Al concentration level is greater than said second Al concentration level and said second concentration level is at least about 30 atomic percent Al.

24. The method of claim 20, wherein reacting comprises heat-treating said first layer and said second layer.

25. The method of claim 24, wherein heat-treating comprises heating said substrate in situ during deposition of said second coating layer.

26. The method of claim 20, further comprising disposing a thermal barrier coating over said reacted coating layer.

27. The method of claim 26, wherein disposing said thermal barrier coating comprises disposing a ceramic material.

28. The method of claim 27, wherein disposing said ceramic material comprises disposing a material comprising yttria-stabillized zirconia.

29. A method for protecting an article from a high-temperature, oxidative environment, said method comprising:

providing a metallic substrate;

disposing a first coating layer onto said substrate, wherein said first coating layer comprises nickel (Ni), aluminum (Al), chromium (Cr), zirconium (Zr), up to about 20 atomic percent cobalt (Co), and up to about 20 atomic percent iron (Fe);

disposing a second coating layer onto said first coating layer using a physical vapor deposition technique selected from the group consisting of electron beam physical vapor deposition and ion plasma deposition, wherein said second coating layer consists essentially of aluminum; and reacting said first coating layer with said second coating layer to form a substantially single-phase reacted coating layer comprising a B2-structured nickel aluminide and further comprising a gradient in Al composition, said gradient extending from a first Al concentration level at an outer surface of said reacted coating layer to a second Al concentration level at an interface between said substantially single-phase coating and said substrate, wherein said first Al concentration level is greater than said second Al concentration level and said second concentration level is at least about 30 atomic percent Al.

* * * * *